United States Patent Office 3,711,389
Patented Jan. 16, 1973

3,711,389
PROCESS FOR TREATING POLYMERIC SUBSTRATES WITH HIGH-ENERGY RADIATION
Edwin O. Hook, Marshfield, and Larry D. Nichols, Belmont, Mass., assignors to Moleculon Research Corporation, Cambridge, Mass.
No Drawing. Filed July 15, 1969, Ser. No. 841,981
Int. Cl. B01j *1/10, 1/12;* C07c *125/00*
U.S. Cl. 204—159.12                     13 Claims

ABSTRACT OF THE DISCLOSURE

A new group of cyclotri- and cyclotetraphosphazene compounds bearing at least one polymerizable olefinic moiety and a method of enhancing physical properties such as flame resistance, solvent resistance, heat resistance or deformation resistance of a variety of substrates by treatment of the substrate with ionizing radiation and cyclotriphosphazene or cyclotetraphosphazene compounds bearing at least one radical having a polymerizable double bond between the terminal carbon atom and the penultimate carbon atom.

---

This invention pertains to the use of ionizing radiation together with additives based on unsaturated derivatives of phosphazenes to impart improved flame resistance, heat resistance, solvent resistance or deformation resistance to a variety of materials.

The stability of the posphazene nucleus and its compatibility with a wide variety of materials give additives based on the phosphazenes compatibility and usefulness in a large variety of substrates. Furthermore, the high phosphorus and nitrogen content of phosphazenes confers reduced flammability on materials in which they are incorporated. Exposure of the substrate to ionizing radiation leads to radiation-induced grafting of the polymerizable olefinic groups, thereby bonding the phosphazene additive to the substrate material, and imparts increased heat resistance, solvent resistance, and deformation resistance to the modified product.

The new phosphazene compounds and the method of the present invention offer an unusual opportunity to improve, simultaneously, several physical properties and reduce flammability. Furthermore, the stability of the phosphazene nucleus makes the phosphazene additives compatible with many natural and modified natural products as well as with a variety of synthetic polymers.

THE NEW UNSATURATED PHOSPHAZENE COMPOUNDS

The unsaturated phosphazene compounds of the present invention correspond to one of the formulas

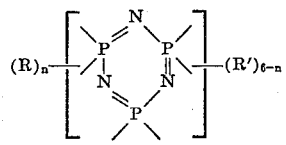

or

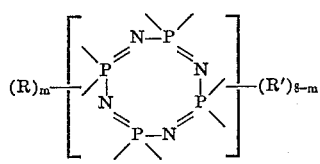

wherein R represents a member of the group comprising alkoxy radicals, aliphatic primary amino radicals and aliphatic secondary amino radicals; R' represents a member of the group comprising polymerizable olefinic radicals; $n$ represents one of the integers 0, 1, 2, 3, 4 or 5; and $m$ represents one of the integers 0, 1, 2, 3, 4, 5, 6 or 7.

In the present specification and claims, the alkoxy radicals and aliphatic primary and secondary amine radicals are selected from piperidino, pyrrolidinyl and the group corresponding to the formula —M—$R_1$ wherein M represents —O—, —NH— or

and $R_1$ represents a lower alkyl group having from 1 to 4 carbon atoms, inclusive. Representative alkoxy and alkylamine radicals include methoxy, ethoxy, n-propoxy, iso-propoxy, n-butoxy, sec-butoxy, iso-butoxy, methylamino, diethylamino, dimethylamino, ethylmethylamino, ethyl - n - butylamino, dipropylamino, di-n-butylamino, ethylpropylamino, n-butylpropylamino, pyrrolidinyl and piperidino.

The term "polymerizable olefinic radical" as employed in the present specification and claims designates a monovalent olefinic radical wherein the terminal carbon atom bears two hydrogen atoms and is bonded to the penultimate carbon atoms by means of a double bond. The polymerizable olefinic radical corresponds to one of the formulas

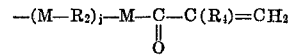

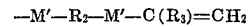

or

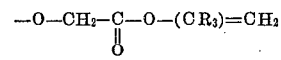

wherein M represents —O—, —NH— or —$NR_1$—; $R_1$ is as previously defined; $R_2$ represents a straight or branched chain lower aliphatic di-radical containing from 2 to 6 carbon atoms; $R_3$ and $R_4$ independently represent hydrogen or methyl; M' represents —O— or

$i$ represents one of the integers 1 or 2; and $j$ represents one of the integers 1 or 2. Representative polymerizable olefinic radicals include 2-allyloxyethoxy,
2-acryloyloxyethoxy,
2-methallyloxyethoxy,
2-methallyloxypropoxy,
4-allyloxybutoxy,
5-methallyloxypentyloxy,
6-allyloxyhexyloxy,
2-allyloxybutoxy,
3-methallyloxypropoxy,
4-acryloyloxybutoxy,
4-acryloyloxy-1-ethylbutoxy,
3-methacryloyloxypropoxy,
2-(methacryloylamino)ethoxy,
3-(N-allyl-N-ethylamino)propylamino,
N'-[6-N-methalllyl-N-methylamino)hexyl]-N'-butylamino,
N'-[2-(N-acryloyl-N-propylamino)ethyl]-N'-ethylamino,
2-(1-vinylethoxy)ethoxy,
5-(1-vinylethoxy)pentyloxy,
2-[N-(1-vinylethyl)-N-methylamino]ethylamino,
N'-{4-[N-(1-vinylethyl)-N-ethylamino]butyl}-N'-ethylamino,
vinyloxyethoxy,
vinyloxyhexyleneoxy,
3-(N-vinyl-N-ethylamino)propoxy, N'-[5-(N-vinyl-N-methylamino)-pentyl]-N'-ethylamino,
N'-{2-[N-(1-methylvinyl)-N-methylamino]ethyl}-
   N'-butylamino and
N'-{4-[N-(1-methylvinyl)-N-ethylamino]-butyl}-
   N'-methylamino.

A preferred group of new unsaturated phosphazene compounds correspond to the formula

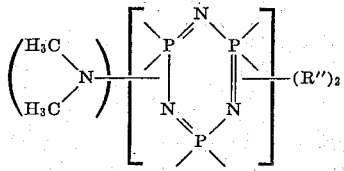

wherein R'' represents the polymerizable radicals selected from the group comprising vinyloxyethoxy, acryloyloxyethylamino, acryloylaminoethylamino, acryloyloxyethoxy, acryloylaminoethoxy, and vinyloxycarbonylmethyleneoxy.

The new unsaturated phosphazene compounds containing at least one polymerizable olefinic radical are produced from a trimeric or tetrameric phosphonitrilic chloride corresponding to the formulas $N_3P_3Cl_{6-n}(R)_n$ or $N_4P_4Cl_{8-m}(R)_m$ by replacing each of the chlorine atoms with polymerizable olefinic groups. As previously stated, $n$ represents one of the integers 0, 1, 2, 3, 4 or 5 and $m$ represents one of the integers 0, 1, 2, 3, 4, 5, 6 or 7. The new unsaturated phosphazene compounds are conveniently prepared by reacting, in the presence of a hydrogen chloride acceptor, the tri- or tetrameric phosphonitrilic chloride, and an olefinic alcohol or olefinic amine wherein one terminal carbon atom bears two hydrogen atoms and is bonded to the penultimate carbon by means of a double bond. The olefinic alcohol and amine starting materials correspond to one of the formulas:

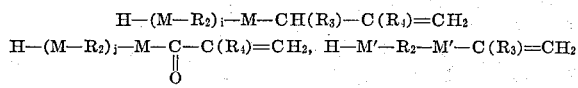

and

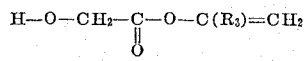

The reaction is carried out in an inert organic solvent or in an excess of the alcohol or amine compound as reaction medium.

Representative organic solvents include aromatic hydrocarbons such as benzene, toluene, xylene, chlorobenzene and the like; ethers such as diethylether, dioxane, and the like; chlorinated hydrocarbons such as chloroform, carbon tetrachloride, trichloroethane and the like; acid amides, e.g., di-lower alkylacetamides such as dimethylacetamide, diethylacetamide, etc. Acceptable hydrogen chloride acceptors include pyridine, tertiary bases such as tertiary alkylamines, e.g. triethylamine and the like.

The reaction proceeds readily at temperatures between —35 and 150° C. and conveniently at between 20 and 120° C. with the production of the desired phosphazene product and hydrogen halide reaction by-product. In a convenient procedure, the reaction is carried out at the reflux temperature of the reaction mixture. If it is necessary to employ temperatures in excess of the reflux temperature, the reaction is carried out under super-atmospheric pressures.

The reaction mixture is maintained in the reaction temperature range for a period of from ½ to 12 hours and conveniently until there is a cessation in the formation of the hydrogen chloride reaction by-product. The salt formed between the hydrogen chloride by-product and the hydrochloride acceptor separates in the reaction mixture as solid residue or a heavy oil. A substantial cessation in the production of the hydrogen halide-acceptor salt indicates the reaction is substantially complete.

The reaction consumes one molar equivalent of olefinic alcohol or olefinic amine for each molar equivalent of chlorine to be replaced and good yields of the desired phosphazene product are obtained when the reactants are employed in such stoichiometric proportions, i.e., 6-n or 8-m molar proportions of olefinic alcohol or amine. Amounts of olefinic alcohol or amine in excess of the theoretical amount required can be employed; however, the use of large excesses is generally not economical.

In carrying out the reaction, the phosphonitrilic chloride, the alcohol or amine and hydrogen halide acceptor are dispersed in the reaction medium in any order and the temperature of the reaction mixture maintained within the reaction temperature range for the desired reaction period, conveniently until there is a substantial cessation in the production of the hydrogen halide salt.

Following the reaction period, the mixture is cooled, and the hydrogen chloride salt is removed by filtration or extraction with cold water and the liquid reaction mixture washed with cold water until the aqueous washings are neutral. The washed organic phase is then dried, stripped of low boiling constituents in a vacuum, and the unsaturated phosphazene product isolated by standard techniques such as vacuum distillation or crystallization. The product can be employed in the method of the present invention as isolated or further purified by fractional distillation, recrystallization or various chromatographic techniques such as liquid chromatography before being so employed. The synthesis generally results in the production of a mixture of isomers which can be separated by known procedures such as liquid chromatography; however, for the purposes of the method of the present invention, the mixture of isomers is perfectly acceptable, as good a result being obtained when employing a mixture of isomers as when employing a single isomer.

In the final unsaturated phosphazene product, the position of the alkoxy or aliphatic amine substituents will be the same as on the starting material. The polymerizable olefinic radicals will replace the chlorine atoms thereby assuming their positions in the ring. The present invention is directed to all of the various constitutional (structural) isomers and the various stereoisomers of the unsaturated phosphazenes described by the formulas employed herein. Furthermore, for the purposes of the present invention the constitutional isomers and stereoisomers of an unsaturated phosphazene defined by the formulas herein are equivalents.

In an alternate procedure, the unsaturated phosphazene compounds wherein the olefinic radical is bonded to the phosphorus through an oxygen atom can be produced by reacting together a phosphonitrilic chloride corresponding to one of the formulas $N_3P_3Cl_{6-n}(R)_n$ or $N_4P_4Cl_{8-m}(R)_m$ with a metal derivative of an olefinic alcohol. Representative metals include sodium, potassium and the like. The reaction, which is conveniently carried out in an inert organic liquid as reaction medium, can be carried out in the absence of a hydrogen chloride acceptor. The rest of the reaction conditions, the proportions of reactants and methods of isolating the product, are the same as set forth for the reaction employing the alcohol or amine as a starting material.

In still another procedure, the unsaturated phosphazene derivatives wherein the unsaturated olefinic group terminates in an acryloyl or methacryloyl radical are prepared by reacting the trimeric or tetrameric phosphonitrilic chloride corresponding to one of the formulas $N_3P_3Cl_{6-n}(R)_n$ or $N_4P_4Cl_{8-m}(R)_m$ with a difunctional alkylene compound corresponding to the formula H—M—R$_2$—M—H to form the intermediate phosphazene compound corresponding to one of the formulas $$N_3P_3(R)_n(-MR_2MH)_{6-n}$$

or 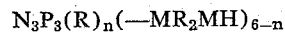 $N_4P_4(R)_m(-MR_2MH)_{8-m}$. The intermediate phosphazene compound is then reacted with acryloyl chloride or methacryloyl chloride which adds to the free amine or hydroxy group with the production of the corresponding unsaturated phosphazene and hydrogen chloride reaction by-product.

The reaction between the phosphonitrilic chloride and the difunctional alkylene compound is carried out in the presence of a hydrogen chloride acceptor and in an inert organic liquid or in an excess of the difunctional alkylene compound as the reaction medium. The replacement of the chlorines by the difunctional alkylene group takes place under the same reaction conditions and in the same proportions as employed to replace the chlorines with the polymerizable olefinic groups.

Following the reaction period, the intermediate can be isolated by a standard procedure such as distillation or crystallization and then reacted with the acryloyl chloride or methacryloyl chloride. In a convenient procedure, the intermediate compound is reacted in situ with the acryloyl chloride or methacryloyl chloride. The additional reaction between an acid halide such as acryloyl chloride or methacryloyl chloride and the intermediate compound is carried out in the presence of a hydrogen chloride acceptor and in an inert organic liquid as the reaction medium. The reaction takes place readily at a temperature of from 20 to 50° C. with the production of the unsaturated phosphazene derivative and the halide salt reaction by-product. The reaction consumes one molar equivalent of aicd halide for each (—M—$R_2$—M—H) moiety of the phosphazene nucleus, and the use of the reactants in such proportions is preferred. Following the reaction period, the unsaturated phosphazene compound is isolated as previously described and employed in the method of the present invention.

METHOD OF THE PRESENT INVENTION

In addition to the new unsaturated phosphazene compounds, the present invention is directed to a process for imparting improved properties to a variety of substrates. Through the use of the method of the present invention, one or more of the following properties is conferred or enhanced: flame resistance, heat resistance, solvent resistance, and deformation resistance. The process of the present invention comprises treating the substrate material with one or more unsaturated phosphazene compounds and from 1 to 10 megarads of ionizing radiation.

The unsaturated phosphazene compounds suitable for use in the process of the present invention include the new unsaturated derivative of the present invention as well as known phosphazene compounds bearing at least one polymerizable radical wherein the terminal carbon atom bears two hydrogen atoms and is bonded to the penultimate carbon atom by means of a double bond. Suitable phosphazene compounds for use in the method of the present invention correspond to one of the formulas

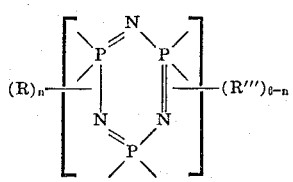

or

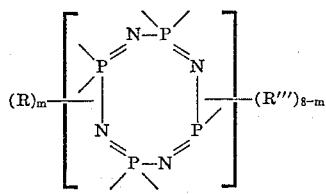

wherein R represents a member of the group comprising alkoxy radicals, aliphatic primary amine radicals and aliphatic secondary amine radicals; R''' represents a polymerizable radical correspondnig to one of the formulas $$—(M—R_2)_y—M—CH(R_3)—C(R_4)\!=\!CH_2$$

$$—(M—R_2)_j—M—\underset{\underset{O}{\|}}{C}—C(R_4)\!=\!CH_2$$

$$—M'—R_2—M'—C(R_3)\!=\!CH_2$$

$$—O—CH_2—\underset{\underset{O}{\|}}{C}—O—C(R_3)\!=\!CH_2$$

and $$—N[CH(R_3)C(R_4)\!=\!CH_2]_2$$

wherein M, M', $R_2$, $R_3$, $R_4$ and $j$ are as previously defined and y represents one of the integers 0, 1, and 2.

A preferred group of unsaturated phosphazene compounds for use in the present invention correspond to the formula

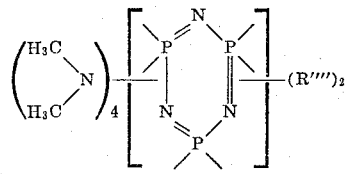

wherein R'''' represents a polymerizable radical selected from the group comprising vinyloxyethoxy, acryloyloxyethylamino, acryloylaminoethylamino, acryloyloxyethoxy, acryloylaminoethoxy, vinyloxycarbonylmethyleneoxy, allylamino and allyloxy.

The substrates to be treated with the unsaturated phosphazene compound or mixtures of phosphazenes include paper, wood fabrics, including those produced from natural or synthetic fibers, e.g., wool, cotton, nylon, rayon, polypropylene, polyethyleneterephthalate, and the like; films produced from natural and synthetic polymers, such as cellophane, nylon, polyethylene, polypropylene, polyethyleneterephthalate, polystyrene, cellulose acetate, polyvinyl acetate, polyvinyl chloride, and the like; and bulk plastic materials produced from synthetic polymers such as polyamides, polyesters, polyolefins, polyethers, and the like.

To achieve the improved properties conferred by this invention, 1 to 45% by weight of one or more unsaturated phosphazene compounds is blended, padded, sorbed or impregnated into the substrate. The unsaturated phosphazene compound or mixtures thereof can be added directly to the substrate and admixed therewith without the use of a carrier or adjuvant. However, for treatment of many materials, it is convenient to disperse the unsaturated phosphazene compound in a liquid carrier such as an anhydrous or aqueous lower alkanol, ester, ketone, amide, sulfoxide, or the like.

Introduction of the unsaturated phosphazene compound into fabrics or paper is conveniently accomplished by padding the substrate with the pure liquid unsaturated phosphazene or with a solution of the unsaturated phosphazene in a solvent which permeates the fabric or paper; uniform sorption without padding can alternatively be employed. The material can also be incorporated into the paper by introducing the unsaturated phosphazene directly into the furnish. Similarly, the unsaturated phosphazene can be added to the polymer formulation employed to produce synthetic fibers.

Introduction of the unsaturated phosphazene into bulk polymer is accomplished by milling and/or mechanical blending of the desired concentration of additive with pellets or powder of the polymer until a uniform mixture is obtained, followed by high-shear blending at a temperature above the polymer softening point. This final blending can be a separate unit operation, or combined with some other high-shear operation such as extrusion.

Introduction of the unsaturated phosphazene compound into films or fibers is accomplished by preparation of the films or fibers from bulk polymer containing the unsaturated phosphazene or by sorption from the liquid phosphazene or a solution of the phosphazene in a suitable permeating or swelling solvent such as aqueous methanol or ethanol, dimethylsulfoxide, etc.

Introduction of the additive into bulk permeable materials such as wood or the like is accomplished by impregnation with liquid unsaturated phosphazene with or without first drying and/or evacuating the substrate material. Alternatively, the unsaturated phosphazene derivative can be dissolved in a suitable organic carrier and the solvent solution employed to impregnate the wood in accordance with standard impregnation techniques, including placing the wood or other bulk material in an air tight chamber, evacuating the air from the chamber and thereafter injecting the phosphazene into the chamber.

The temperature at which the unsaturated phosphazene compound is introduced is chosen to give an adequate rate of permeation or blending without exceeding the degradation temperature of the phosphazene or substrate material. Final blending with bulk polymers must be conducted at a temperature above the polymer softening point, and sorption of pure phosphazenes must be conducted above the melting point of the additive. Generally, the treated substrate is exposed to from 1 to 10 megarads of ionizing radiation, such as gamma radiation from cobalt-60 or energetic electrons from an accelerator such as a linear accelerator, Van de Graaf generator or other electron source, following treatment of the substrate with the unsaturated phosphazene. The irradiation can be performed in air, vacuum or an inert atmosphere such as nitrogen, though the use of air is detrimental to the final properties, particularly if irradiation is conducted over a period in excess of a few seconds.

While the substrate is often exposed to the ionizing radiation following treatment with the unsaturated phosphazene, the substrate can also be exposed to the ionizing radiation prior to being treated with the unsaturated phosphazene. Exposure of the substrate to the ionizing radiation produces free radicals in substrates such as the natural and synthetic polymeric materials previously mentioned. The radiation induced free radicals react with the polymerizable olefinic moiety when the substrate is treated with the unsaturated phosphazene. Because of the high reactivity of the free radicals formed by the ionizing radiation, it is necessary to irradiate the substrate under an inert atmosphere or in a vacuum and to maintain the substrate in the inert atmosphere or an atmosphere from which the oxygen has been removed until the substrate is treated with the unsaturated phosphazene. Optimum results are obtained if the unsaturated phosphazene is applied to the irradiated substrate within a few hours of irradiation. Longer periods between irradiation and treatment with the unsaturated phosphazene can be employed if the integrity of the inert atmosphere or vacuum is maintained, i.e., if the inert atmosphere or vacuum does not contain any species which will react with the radiation induced free radicals. It is, however, difficult to maintain such a non-reactive environment for long periods; it is therefore recommended that the irradiated substrate be treated with the unsaturated phosphazene within a few hours of irradiation. The amount of unsaturated phosphazene and methods of treatment are the same as previously discussed.

SPECIFIC EMBODIMENTS

Example 1

Bis(allyloxy) - tetrakis(dimethylamino) - cyclotriphosphazene: Tetrakis(dimethylamino)-dichlorocyclotriphosphazene was prepared by reacting phosphonitrilic chloride (81 g., 0.23 mol) with excess anhydrous dimethylamine (100 g., 2.2 mols) in ether solution (400 cc.) substantially as described by R. Keat and R. A. Shaw, J. Chem. Soc., 1965, pp. 2215–23. The white crystalline product was obtained in a yield of 81 g. (91%) on removing the ether solvent from the filtered reaction mixture.

A solution of 38.2 g. (0.1 mol) of the above product in 100 cc. of toluene was added to a sodium allylate solution prepared by dissolving 5.1 g. (0.22 mol) of metallic sodium in 46.4 g. (0.8 mol) of allyl alcohol. The mixture was refluxed for 3 hours and allowed to stand overnight, after which it was filtered from the precipitate of sodium chloride. After washing with ether and drying, the recovered salt weighed 10.4 g. (theory 11.6 g.). The mother liquor was washed with small portions of cold water until neutral to alkacid test paper, dried over anhydrous sodium sulfate, and vacuum distilled; yield 30 g. of the bis(allyloxy)-tetrakis(dimethylamino) - cyclotriphosphazene product as a clear colorless oil which boiled over a range of ca. 145°–155° C. at less than 1 mm. Hg pressure.

The following unsaturated phosphazene compounds of the present invention are prepared in accordance with the method described in Example 1 as follows:

Tetrakis (2-allyloxyethoxy)-tetrakis(diethylamino)-cyclotetraphosphazene (molecular weight 873) by reacting together 2-allyloxyethanol and tetrakis(diethylamino)-tetrachlorocyclotetraphosphazene.

Bis(5 - methallyloxypentyloxy) - tetrakis(ethylamino)-cyclotriphosphazene (molecular weight 625.7) by reacting together tetrakis(ethylamino) - dichlorocyclotriphosphazene and 5-methallyloxy-n-pentanol.

Tris 5 - (methallyloxypentylamino) - tris(n-butoxy)-cyclotriphosphazene (molecular weight 931.95) by reacting together tris-(n-butoxy)-trichlorocyclotriphosphazene and 5-methallyloxypentylamine.

Tris{2-[-(1-methylvinyl) - N - methylamino]ethyl}-N′-butylamino] - pentakis(dimethylamino) - cyclotetraphosphazene (molecular weight 821.2) by reacting together pentakis(dimethylamino)-trichlorocyclo-tetraphosphazene and 2-[N-(1-methylvinyl) - N - methylamino]-ethyl-N′-butylamine.

Tetrakis[5-(1-buten - 3 - yloxy)pentyloxy]-bis(dipropylamino)-cyclotriphosphazene (molecular weight 964.2) by reacting together bis(dipropylamino) - tetrachlorocyclotriphosphazene and 5-(1-buten-3-yloxy)pentanol.

Bis[2 - (methacryloylamino)ethoxy] - tetrakis(diethylamino)-cyclotriphosphazene (molecular weight 679.8) by reacting together tetrakis(diethylamino)-dichlorocyclotriphosphazene and 2-(methacryloylamino)ethanol.

Tetrakis(dimethylamino) - bis(vinyloxycarbonylmethyleneoxy)-cyclotriphosphazene (molecular weight 513.45) by reacting together tetrakis(dimethylamino) - dichlorocyclotriphosphazene and (vinyloxycarbonyl)-methanol.

Tetrakis(dimethylamino) - bis(vinyloxyethoxy) - cyclotriphosphazene (molecular weight 483.47) by reacting together tetrakis(dimethylamino) - dichlorocyclotriphosphazene and 2-vinyloxyethanol.

Hexakis[N - methallyl-N-methyl-N′-(n-butyl)-1,6-hexanediamino] - cyclotriphosphazene (molecular weight 1493.4) by reacting together trimeric phosphonitrilic chloride and N-methallyl - N - methyl - N′ - butyl-1,6-hexanediamine.

Octakis(vinyloxyethoxy) - cyclotetraphosphazene (molecular weight 876.7) by reacting together tetrameric phosphonitrilic chloride and 2-(vinyloxy)ethanol.

Tetrakis[2-(2-allyloxyethoxy)ethoxy] - bis(methylpropylamino)-cyclotriphosphazene (molecular weight 859.96) by reacting together 2-(2-allyloxyethoxy)ethanol and bis-(methylpropylamine-tetrachloro-cyclotriphosphazene.

2-allyloxyethoxy - pentakis(dimethylamino) - cyclotriphosphazene (molecular weight 456.47) by reacting together 2-(2-allyloxy)ethanol and chloro-pentakis(dimethylamino)-cyclotriphosphazene.

Pentakis[2 - (3 - methallylaminopropylamino)ethylamino] - dimethylaminocyclotriphosphazene (molecular weight 1030.45) by reacting together pentachloro-dimethylaminocyclotriphosphazene and (3 - methallylaminopropyl)ethylenediamine.

Bis(acryloylaminoethylamino) - tetrakis(dimethylamino)-cyclotriphosphazene (molecular weight 537.6) by reacting together tetrakis(dimethylamino)-dichlorocyclotriphosphazene and 2-(acryloylamino)ethylamine.

Bis(acryloyloxyethoxy) - tetrakis(dimethylamino)-cyclotriphosphazene (molecular weight 541.6) by reacting together tetrakis(dimethylamino) - dichlorocyclotriphosphazene and 2-acryloyloxyethanol.

Bis(acryloylaminoethoxy) - tetrakis(dimethylamino)-cyclotriphosphazene (molecular weight 539.5) by reacting together tetrakis(dimethylamino) - dichlorocyclotriphosphazene and 2-(acryloylamino)ethanol.

Example 2

Bis(2-allyloxyethoxy) - tetrakis(dimethylamino) - cyclotriphosphazene: Sodium methylate (12 g., 0.22 mol) was added to a stirred mixture of 41 g. (0.4 mol) of 2-allyloxyethanol (obtained from K & K Laboratories, Inc.) and 100 cc. of toluene, and the solution distilled to a pot temperature of 110° C. to remove methanol. The 50 cc. of distillate which was slowly removed during the stripping was replaced by adding 50 cc. of toluene. The resulting solution of sodium 2-allyloxyethylate was treated with a solution of 38.2 g. (0.1 mol) of tetrakis(dimethylamino) - dichlorocyclotriphosphazene in 150 cc. of toluene and the reaction worked up as described in Example 1. Vacuum distillation yielded 25 g. of the bis(2-allyloxyethoxy) - tetrakis(dimethylamino) - cyclotriphosphazene products as a nearly colorless oil (B.P. ca. 155°–170° C. at below 1 mm. pressure) which crystallized to a white solid.

Example 3

Bis(allylamino) - tetrakis(dimethylamino) - cyclotriphosphazene: Tetrakis(dimethylamino) - dichlorocyclotriphosphazene (38.2 g., 0.1 mol), toluene (200 cc.) and allylamine (28 g., 0.5 mol) were mixed, stirred and refluxed for 3 hours. Cold water was added to the chilled reaction mixture to dissolve amine hydrochloride and excess amine. The organic layer was separated and washed three times with small portions of cold water, dried over anhydrous sodium sulfate, and stripped to a pot temperature of 110° C. under ca. 10 mm. pressure. The resulting pale yellow oil (32 g.) was vacuum distilled to give 19 g. of the bis(allylamino) - tetrakis(dimethylamino) - cyclotriphosphazene product (B.P. ca. 160°–175° C. at below 1 mm.) which partially crystallized in the receiver.

Example 4

Tetrakis(dimethylamino) - dichlorocyclotriphosphazene (0.1 mole) was converted to tetrakis(dimethylamino)-bis-(2-hydroxyethylamino) - cyclotriphosphazene by reaction with excess 2-hydroxyethylamine (0.5 mole) in diglyme at a temperature of 115°–120° C. for 2 hours. Following the reaction period, the diglyme solution was separated from the precipitated hydroxyethylamine salt, and solvent and excess amine removed under reduced pressure. The residue was redissolved in diglyme, excess triethylamine was added, and acryloyl chloride (0.2 mole) added slowly, maintaining the temperature below 30° C. by cooling. After 6 hours at 25° C. solvents and excess amine were removed by distillation in vacuo at a temperature below 50° C. The residue was taken up in ether, washed repeatedly with small portions of cold water to remove residual amine and amine hydrochloride, and dried over anhydrous sodium sulfate. Removal of the ether under reduced pressure yielded the bis(acryloyloxyethylamino)-tetrakis(dimethylamino)-cyclotriphosphazene product as a pale yellow oil.

The following new unsaturated phosphazene compounds are produced in accordance with the process described in Example 4 and as follows:

Tris(2 - methacryloylaminoethoxy) - tris(di-n-butylamino)-cyclotriphosphazene (molecular weight 872.26) by reacting together methacryloyl chloride and tris(2-aminoethoxy) - tris(di - n-butylamino)-cyclotriphosphazene.

Tetrakis(methacryloyloxybutylamino) - bis(pyrrolidinyl) - cyclotriphosphazene (molecular weight 870.1) by reacting together methacryloyl chloride and tetrakis(4-hydroxybutylamino) - bis(pyrrolidinyl) - cyclotriphosphazene.

Tetrakis(acryloyloxybutoxy) - tetrakis(diethylamino)-cyclotetraphosphazene (molecular weight 1037.07) by reacting together acryloyl chloride and tetrakis(4-hydroxybutoxy) - tetrakis (diethylamino)-cyclotetraphosphazene.

Bis(methacryloyloxyethoxybutoxy) - tetrakis(diethylamino)-cyclotriphosphazene (molecular weight 817.93) by reacting together bis(2-hydroxyethoxybutoxy)-tetrakis-(diethylamino)-cyclotriphosphazene and methacryloyl chloride.

Example 5

8.5 parts of hexakis(methallyloxy)-phosphazene were blended with 100 parts of nylon-12 in a high-shear mixing head at 225° C. under a nitrogen atmosphere. The viscosity and visco-elasticity of the melt increased during the addition. The blend was cooled and irradiated in nitrogen to 3 megarads in a commercial cobalt-60 source. The irradiated samples show 48% insolubility in meta-cresol after 16 hours at 80° C. (i.e., 48% gel). Irradiated or unirradiated samples of phosphazene-free nylon-12 dissolved completely. Identical pressed films of treated and irradiated and untreated nylon mounted vertically and ignited at the bottom showed marked flame retardance in the treated sample, which burned less than one third the distance of the untreated sample in an equal period of time, and with much less melting and dripping.

Example 6

In further operations carried out in accordance with the method described in Example 5, tris(2-metallyloxypropoxy)-tris(di-n-butylamino)-cyclotriphosphazene,
bis(vinyloxyethoxy)-tetrakis(dimethylamino)-cyclotriphosphazene,
tetrakis(allyloxypentyloxy)-bis(methylhexylamino)-cyclotriphosphazene,
hexakis(allyloxy)-cyclotriphosphazene,
octakis(allyloxyethoxy)-cyclotetraphosphazene,
bis(N-vinyl-N-ethylaminopropoxy)-tetrakis(methoxy)-cyclotriphosphazene and
tetrakis(vinyloxyethoxy)-bis(dipropylamino)-cyclotriphosphazene are each employed as the sole unsaturated phosphazene for the treatment of nylon-12. The phosphazene is added in an amount equivalent to 12% by weight of the nylon-12. The treated nylon strips thus produced are irradiated in nitrogen atmosphere to 5 megarads employing a cobalt-60 source. Pressed films prepared from the treated and irradiated nylon show increased insolubility in meta-cresol and marked increase in flame retardance over irradiated films of nylon-12 not containing the phosphazene component.

Example 7

0.1 cm. by 8.2 cm. cylindrical samples of northern white birch were impregnated with hexakis(methallyloxy)-cyclotriphosphazene by soaking for one hour at room temperature, drying with absorbent paper, and warming to 45° C. for 30 minutes. Weight gains averaged 12%. Some samples were then irradiated in nitrogen to 3 megarads with cobalt-60. After agitation for 1 hour with 15 Ajax solution, treated but unirradiated samples showed a loss of 46% of the additive, while irradiated samples lost only 33%. The irradiated samples also showed less water pickup during washing and a more rapid return to dry weight after washing. Burning tests were run on horizontally mounted samples ignited with a small hot flame at their free ends. Control samples burned completely at a rate of 0.15 cm./sec. Unwashed phosphazene-treated samples, whether or not irradiated, burned at a rate of 0.08 cm./sec. and self-extinguished after 10 to 12 seconds. Washed samples burned at about 0.09 cm./sec. and self-extinguished in 20–22 seconds.

Example 8

Tris[2-(1-vinylethoxy)ethoxy]-tris(di-methylamino)-cyclotriphosphazene,
tetrakis(methacryloyloxypropoxy)-tetrakis-(butylamino)-cyclotetraphosphazene,
hexakis(4-allyloxybutoxy)-bis(methylethylamino)-cyclotetraphosphazene,
bis[5-(1-vinylethoxy)pentyloxy]-hexakis(propoxy)-cyclotriphosphazene,
tetrakis(dimethylamino)-bis(vinyloxyethoxy)-cyclotetraphosphazene,
bis(allyloxy)-tetrakis(dimethylamino)-cyclotriphosphazene, and
hexakis(diallylamino)-cyclotriphosphazene are each employed as described in Example 7 to treat wood samples. Treated and irradiated samples show marked increase in flame retardancy.

Example 9

Four parts of hexakis(allylamino)-cyclotriphosphazene and two parts of hexakis(methallyloxy)-cyclotriphosphazene were extruded with 100 parts of nylon-12 in the form of 1/16" rod after preliminary mechanical blending of the additives with the nylon. Samples of this rod irradiated in nitrogen to 5 megarads with cobalt-60 showed a higher elastic modulus than phosphazene-free nylon, irradiated or unirradiated. Extraction with metacresol at 80° C. for 16 hours dissolved only 25% of the phosphazene-containing samples (75% gel). Phosphazene-free samples dissolved completely. Burning tests showed that phosphazene-containing samples self-extinguished in horizontal and 45° flame tests after consuming less than ½" of the 3-inch sample. Phosphazene-free samples burned completely when ignited in horizontal and 45° flame tests. In the 45° C. angle flame test, the sample is oriented at 45° from horizontal.

Example 10

Further operations carried out as described in Example 9 are conducted employing each of the following as the sole phosphazene component:

hexakis(allylamino)-cyclotriphosphazene,
octakis(allylamino)-cyclotetraphosphazene,
tetrakis(2-acryloyloxyethoxy)-bis(diethylamino)-cyclotriphosphazene,
bis(2-allyloxyethoxy)-hexakis(ethylamino)-cyclotetraphosphazene,
bis[N' - {4 - [N - (1-methylvinyl)-N-ethylamino]-butyl}-N'-methylamino]-tetrakis(ethoxy)-cyclotriphosphazene and
hexakis(N-allyl-N-butylamino)-cyclotriphosphazene,
bis(allylamino)-tetrakis(dimethylamino)-cyclotriphosphazene and
tetrakis(dimethylamino)-bis(vinylcarbonyl-methyleneoxy)-cyclotriphosphazene.

The treated nylon samples are formed into 1/16" rod and irradiated in nitrogen to 2 megarads with cobalt-60. The irradiated samples show a marked increase in solvent resistance over irradiated controlled samples containing no phosphazene (control samples dissolved completely).

Example 11

A commercial sample of 1.5 mil cellophane was washed with acetone and exposed to liquid tetrakis(dimethylamino)-bis(allyloxy)-cyclotriphosphazene for one hour at 100° C. The dried sample showed no loss in plasticity. A 2" to 1" sample of the phosphazene-treated cellophane was mounted horizontally and ignited at the midpoint of a 2" side. The flame self-extinguished after burning over about ½ the total area. An identical phosphazene-free sample burned completely under the same conditions.

Example 12

In further operations bis[N'-{4-[N-(1-vinylethyl)-N-ethylamino]butyl} - N' - ethylamino] - tetrakis(propylamino)-cyclotriphosphazene, bis(2 - acryloyloxyethoxy)-tetrakis(dimethylamino)-cyclotriphosphazene and octakis vinyloxyhexyloxy)-cyclotetraphosphazene are each employed as the sole phosphazene material. The treated and irradiated cellophane films shows a marked increase in flame retardency over the non-phosphazene containing control.

Example 13

A 2½" by 8", 6.5 gm. sample of heavy corded sateen cotton duck cloth (mil. spec. C–10296) was allowed to absorb 2.6 gm. of tetrakis(dimethylamino)-bis(2-acryloyloxyethylamino)-cyclotriphosphazene as a solution in 9.4 gm. of methanol containing 1 gm. of water and irradiated in nitrogen to 4.5 megarads with cobalt-60. After washing with methanol, acetone and aqueous detergent, the cloth showed an add-on of 13.6%. The hand of the treated, washed and dried sample was softer and more flexible than that of the original fabric. A 1" by 6" strip of the treated sample hung vertically and ignited at the bottom burned superficially over its whole surface leaving a somewhat carbonized but still moderately strong and flexible material. Under the same conditions a control burned completely to a fine white ash. A 1" by 3" treated sample mounted horizontally and ignited at one end burned for only a few seconds and self-extinguished before the flame had propagated one inch along the fabric. A similar control burned completely under the same conditions.

Example 14

Pentakis(2 - allylethoxy) - diethylaminocyclotriphosphazene, bis(3 - methacryloyloxypylamino) - tetrakis(n-butylamino)-cyclotriphosphazene, bis(2 - acryloylaminoethylamino) - tetrakis(dimethylamino) - cyclotriphosphazene and tetrakis(1 - buten-3-yl-oxybutoxy)-bis(piperidino)-cyclotriphosphazene are each employed in accordance with the method described in Example 13 as the sole phosphazene additive. As a result of these operations, the treated and irradiated cotton fabrics show marked increase in flame retardency when compared with irradiated controls which have not been treated with the phosphazene additives.

Example 15

Paper is treated with 5 to 15% tetrakis(dimethylamino)-bis(2-acryloxyethoxy)-cyclotriphosphazene or bis (2 - allyloxyethoxy) - tetrakis(piperidino) - cyclotriphosphazene or bis(vinyloxycarbonylmethyleneoxy)-tetrakis (dibutylamino)-cyclotriphosphazene by uniform absorption or padding, followed by irradiation in nitrogen to 3 to 8 megarads and extraction of residual soluble materials with methanol. Subsequent flammability tests show a substantial reduction in flammability for the phosphazene treated materials as compared to the irradiated non-phosphazene treated controls.

Example 16

Polypropylene is treated with 5 to 15% tetrakis(dimethylamino)-bis(2 - methacryloyloxyethylamino) - cyclotriphosphazene by blending the additive with polymer pellets until a uniform mixture is obtained, followed by extrusion of the mix at 235° C. and irradiation to 3 to 8 megarads in nitrogen. Subsequent tests show reduced flammability and enhanced elastic modulus and solvent resistance over that of irradiated or unirradiated phosphazene-free polypropylene.

Example 17

A polyvinyl chloride composition of a type suitable for use as electrical insulation is treated with 5 to 15% tetrakis(dimethylamino)-bis(2-methacryloyloxyethyl-
   amino)-cyclotriphosphazene,
tetrakis-(2-methallyloxypropoxy)-tetrakis(piperidino)-
   cyclotetraphosphazene,
bis(2-acryloyloxyethoxy)-tetrakis(dimethylamino)-
   cyclotriphosphazene,
bis(2-acryloyloxyethylamino)-tetrakis(dimethylamino)-
   cyclotriphosphazene or
bis(allylamino)-tetrakis(dimethylamino)-
   cyclotriphosphazene, following the procedure of Example 16, however, employing an extrusion temperature of 200° C. Tests on irradiation samples show reduced solvent solubility, improved elastic modulus, and better retention of these properties at elevated temperatures.

Example 18

Light-weight cotton fabric is padded with a solution prepared by mixing two parts of tetrakis(dimethylamino)-bis(2 - acryloylaminoethylamino) - cyclotriphosphazene, tetrakis(diethylamino) - bis[5 - (1 - vinylethoxy)pentyloxy]-cyclotriphosphazene or bis(4-acryloyloxy - 1 - ethylbutoxy)-tetrakis(n-butoxy)-cyclotriphosphazene with ten parts of methanol and diluting with water until a faint tubidity is produced. The padding is adjusted to place 10 to 25% of the phosphazene on the fabric. After irradiation in nitrogen to 3 to 8 megarads and subsequent laundering, tests show reduced flammability and retention of good hand.

The (R—) substituted trimeric and tetrameric phosphonitrilic chlorides employed as starting materials in the present invention are known in the art and are produced by well known synthetic procedures wherein the phosphonitrilic chloride trimer ($N_3P_3Cl_6$) or the phosphonitrilic chloride tetramer ($N_4P_4Cl_8$) is reacted with an amine or hydroxy compound having at least one active hydrogen. The chlorine atom attached to the ring phosphorus atoms are replaced either geminally or nongeminally by the —R radicals which are linked through nitrogen or oxygen to the ring phosphorous with the resultant production of HCl as a reaction by-product. The reaction between the phosphonitrilic chloride and the alkanol or alkylamine is carried out in an inert organic solvent or in an excess of the alkanol or alkylamine reactant as reaction medium and in the presence of a hydrogen chloride acceptor. The number of substituents added depends upon the solvent employed, the reaction temperature and the proportions of reactants employed. The various isomers formed are separable by standard chromatographic techniques such as liquid phase chromatography and can be identified by spectrographic analysis of their infrared and nuclear magnetic resonance spectra.

Detailed procedures for preparing and isolating the ($R_1$—M—) substituted trimeric and tetrameric phosphonitrilic starting materials of the present invention are to be found in the following references:

U.S. Department of Agriculture Reports, Project Nos. UR–E29–(20)–35 and UR–E29–(20)–55 by R. A. Shaw.
Shaw et al., JCS, (1966), 1677–1680.
Shaw, Record of Chemical Progress, 28:243 (December 1967).
Fitzsimmons et al., JCS, (1964), 1635–1741.
Keat et al., JCS, (1965), 2215–2223.
Das et al., JCS, (1965), 5032–5036.
Ray, JCS, (1963), 3236–3241.
Keat et al., JCS, (1966), 908–913.
Becke-Goehring et al., "Zeitschrift für Anorganische und Allgemeine Chemie" (1959), 103–119.
U.S. Patent Nos. 3,113,129; 3,311,622; 3,197,464; and 3,329,663.

The teachings of these references concerning the preparation of various starting materials are expressly incorporated.

We claim:

1. The method comprising treating a synthetic or natural polymeric substrate with from 1 to 10 megarads of ionizing radiation and an unsaturated phosphazene corresponding to one of the formulas

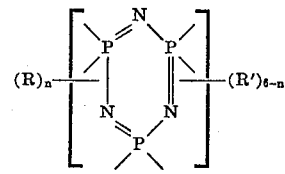

or

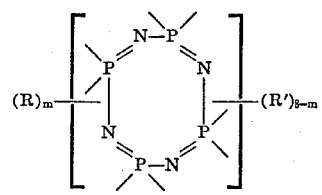

wherein R represents an alkoxy radical or aliphatic primary or secondary amine radical selected from piperidino, pyrrolidinyl and the group corresponding to the formula —M—$R_1$ wherein M represents —O—, —NH—, or

$R_1$ represents a lower alkyl group having from 1 to 4 carbon atoms, inclusive; R' represents a polymerizable olefinic radical selected from the group of polymerizable olefinic radicals wherein the terminal carbon atom bears two hydrogen atoms and is bonded to the penultimate carbon by means of a double bond; n represents one of the integers 0, 1, 2, 3, 4 or 5 and m represents one of the integers 0, 1, 2, 3, 4, 5, 6 or 7.

2. The method of claim 1 wherein the substrate is irradiated prior to the application of the unsaturated phosphazene.

3. The method of claim 1 wherein the substrate is treated with the unsaturated phosphazene prior to being irradiated.

4. The method of claim 1 wherein the unsaturated phosphazene is selected from the group corresponding to the formula

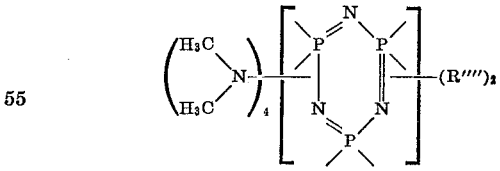

wherein R'''' represents the polymerizable radicals selected from the group comprising 2-vinyloxyethoxy, 2-acryloyloxyethylamino, 2-acryloylaminoethylamino, 2-acryloyloxyethoxy, 2-acryloylaminoethoxy, vinyloxycarbonylmethyleneoxy, allylamino and allyloxy.

5. The method of claim 4 wherein the unsaturated phosphazene is bis(vinyloxyethoxy)-tetrakis(dimethylamino)-cyclotriphosphazene.

6. The method of claim 4 wherein the unsaturated phosphazene is bis(2 - acryloyloxyethylamino)-tetrakis-(dimethylamino)-cyclo-triphosphazene.

7. The method of claim 4 wherein the unsaturated phosphazene is bis(2-acryloylaminoethylamino)-tetrakis-(dimethylamino)-cyclo-triphosphazene.

8. The method of claim 4 wherein the unsaturated phosphazene is bis(2 - acryloyloxyethoxy)-tetrakis(dimethylamino)-cyclo-triphosphazene.

9. The method of claim 4 wherein the unsaturated phosphazene is bis(2 - acryloylaminoethoxy)-tetrakis(dimethylamino)-cyclo-triphosphazene.

10. The method of claim 4 wherein the unsaturated phosphazene is bis(vinyloxycarbonylmethyleneoxy)-tetrakis(dimethylamino)-cyclo-triphosphazene.

11. The method of claim 1 wherein the substrate is a synthetic polymer selected from the group consisting of polyamides, polyesters, polyolefins and polyethers.

12. The method of claim 1 wherein the substrate is a polymer selected from the group of cellulosic polymers.

13. The method of claim 1 wherein the unsaturated phosphazene corresponds to one of the formulas:

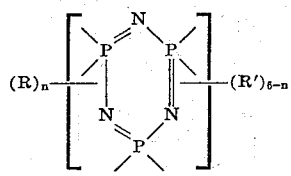

or

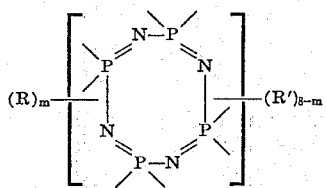

wherein R represents a member of the group comprising alkoxy radicals, aliphatic primary amine radicals and aliphatic secondary amine radicals; R' represents a member of the group comprising polymerizable olefinic radicals; $n$ represents one of the integers 0, 1, 2, 3, 4, or 5 and $m$ represents one of the integers 0, 1, 2, 3, 4, 5, 6, or 7.

References Cited

UNITED STATES PATENTS 3,474,044   10/1969   Goldwhite et al. __ 260—80 PS
3,474,052   10/1969   Halasa et al. _____ 260—2 P MURRAY TILLMAN, Primary Examiner R. B. TURER, Assistant Examiner

U.S. Cl. X.R.

117—93.31, 138.8 E, 138.8 F, 138.8 N; 204—159.15, 159.17; 260—17 A, 17.4 GC, 17.4 CL, 551 P, 857, 873, 874, 877, 878, 884, 885, 927 R